(12) United States Patent
Dunn et al.

(10) Patent No.: US 6,356,664 B1
(45) Date of Patent: Mar. 12, 2002

(54) SELECTIVE REDUCTION OF VIDEO DATA USING VARIABLE SAMPLING RATES BASED ON IMPORTANCE WITHIN THE IMAGE

(75) Inventors: James M. Dunn, Ocean Ridge; Edith H. Stern, Boca Raton, both of FL (US); Barry E. Willner, Briarcliff manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/256,567

(22) Filed: Feb. 24, 1999

(51) Int. Cl.$^7$ .............................. G06K 9/36; G06K 9/46
(52) U.S. Cl. .............. 382/239; 375/240.08; 375/240.21; 375/240.29; 382/175; 382/243; 382/311
(58) Field of Search .................. 341/51, 61; 348/399.1, 348/425.1, 425.3, 427.1, 439.1, 440.1, 441; 358/261.2, 430; 375/240.01, 240.08–240.11, 240.21, 240.26, 240.29; 382/173, 175, 232, 236, 239, 243, 311; 386/4–5, 52

(56) References Cited

U.S. PATENT DOCUMENTS

| | | | |
|---|---|---|---|
| 5,333,212 A | * | 7/1994 | Ligtenberg .................. 382/250 |
| 5,384,598 A | * | 1/1995 | Rodriguez et al. ........ 348/439.1 |
| 5,432,871 A | * | 7/1995 | Novik ......................... 382/232 |
| 5,434,567 A | * | 7/1995 | Mack et al. ................. 341/232 |
| 5,793,895 A | | 8/1998 | Chang ......................... 382/236 |
| 5,914,755 A | * | 6/1999 | Ito et al. ................... 348/439.1 |
| 6,195,387 B1 | * | 2/2001 | Moeller et al. ........... 348/439.1 |
| 6,259,427 B1 | * | 7/2001 | Martin et al. ............... 358/445 |

OTHER PUBLICATIONS

Vlahakis et al., "ROI approach to Wavelet–Based, Hybrid Compression of MR Images", Jul. 1997, pp. 833–837, IEEE.*

AOE Sub Group,, ISO/IEC JTC1/SC29/WG11 N998 MPEG 95, MPEG–4 Proposal Package Description (PPD)—Revision 3 (Tokyo Revision), Jul. 1995, pp. 1–12.*

* cited by examiner

*Primary Examiner*—Timothy M. Johnson
(74) *Attorney, Agent, or Firm*—Robert Lieber; Richard A. Tomlin

(57) ABSTRACT

In a reduction process, data in portion buffers are selectively sampled at different sampling rates proportional to their assigned weights. For instance, portions assigned highest weights could be sampled at a reference rate corresponding to the repetition frequency of the originally received frames, portions assigned lowest weights could be sampled at 1/10th the reference rate, and portions assigned weights intermediate the lowest and highest ones could be sampled at rates less than the reference rate but more than 1/10th the reference rate. Accordingly, sampled portions assigned less than highest weights, but containing data representing objects in motion, could be subject to reproduction with less clarity than sampled portions assigned highest weight. In one application, video data depicting a public figure addressing an audience is processed to assign highest weights to the speaker's facial features, arms and other relevant body parts, and lesser weights to other picture elements including members of the audience. In another example, video data captured by a surveillance camera is processed to assign highest weights to picture elements capable of representing unauthorized intrusion into a scanned area, and lesser weights to data representing objects that are either static or in the equivalent of a static condition. In another example, video data representing a commercial to be televised is processed to assign highest weights to an advertised object or product worn or carried by a person in motion (e.g. sneakers worn by a moving athlete) and lesser weights to picture parts not directly relevant to the advertised object.

11 Claims, 4 Drawing Sheets

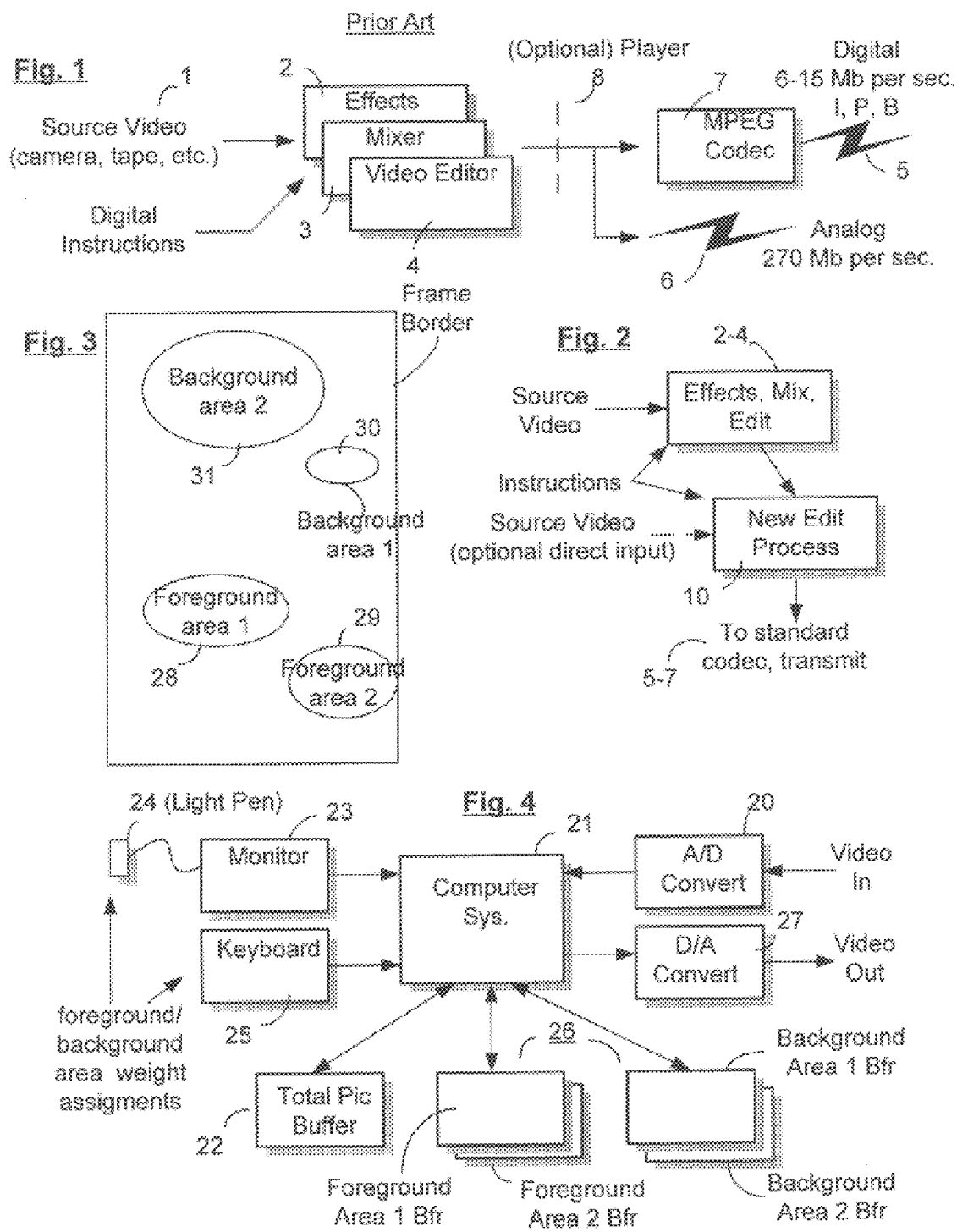

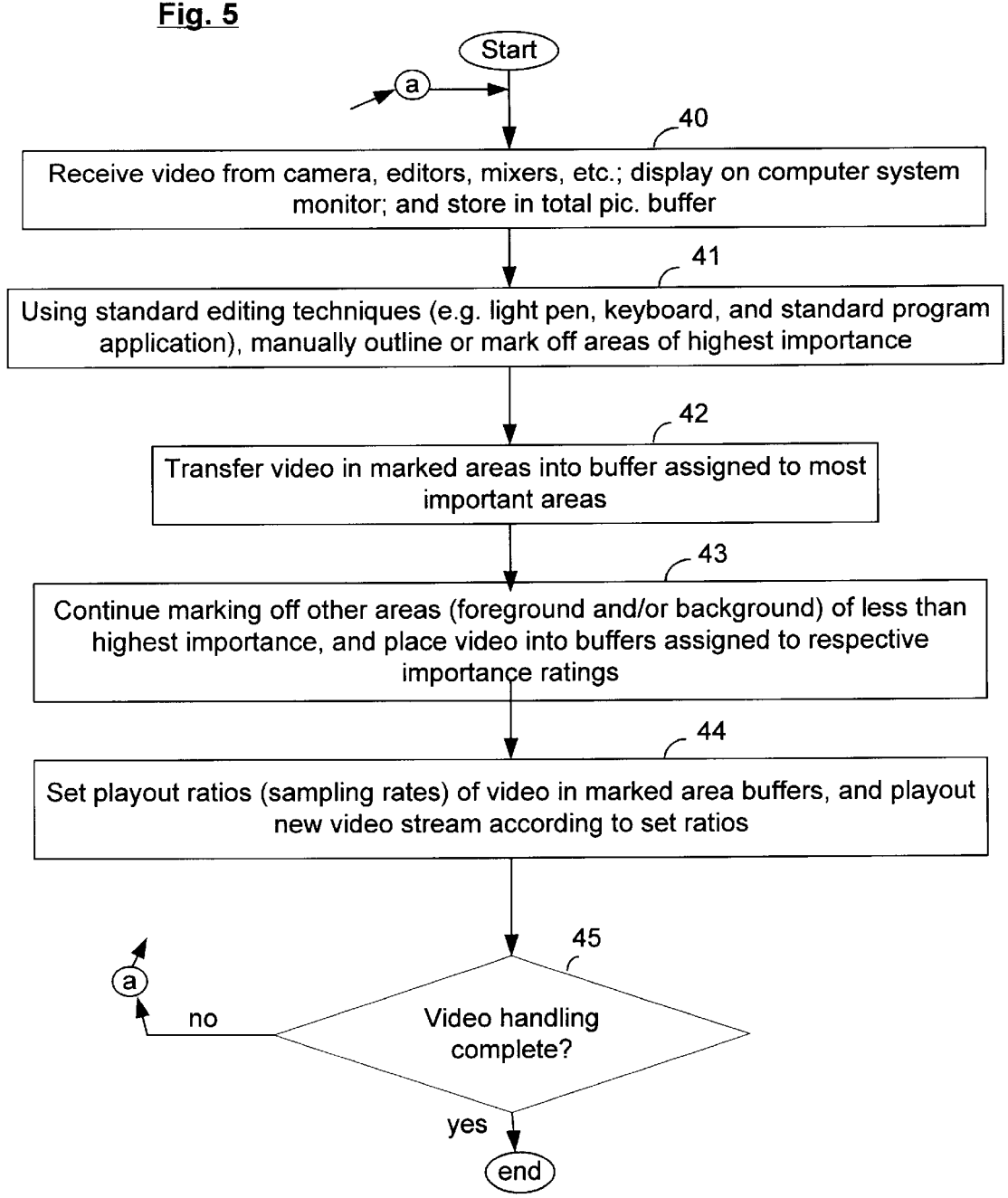

SELECTIVE REDUCTION OF VIDEO DATA USING VARIABLE SAMPLING RATES BASED ON IMPORTANCE WITHIN THE IMAGE

CROSS-REFERENCES TO RELATED APPLICATIONS

U.S. Pat. No. 5,793,895—granted Aug. 11, 1998 to Yuan-Chi Chang et al, entitled INTELLIGENT ERROR RESILIENT VIDEO ENCODER, and assigned to the International Business Machines Corporation, discloses a video compression method that differs from but could be applied together with the data reduction technique disclosed in this application.

GLOSSARY OF TERMS

I-Frame: stand-alone image data, usually compressed using JPEG compression techniques, containing all information needed to fully recreate the associated image P-Frame: image data representing a "forward predicted" video frame, that is coded using motion vectors and error blocks to allow reconstruction from a reference frame, actually a previous P or I type frame in the same stream of image frame data B-Frame: image data coded like P-frames, but with a bi-directional context of referral wherein motion vectors can refer to either a previous frame, a subsequent frame, or both.

MPEG: A video compression technique that maps signals representing a series of standard motion picture frames into a series of I, B, and P frames.

MJPEG: A video compression technique in which individual frames are separately compressed using the MPEG standard NTSC: National Television Standards Committee. Also used as a name for that committee's standard for broadcast quality video capture and reproduction.

PAL: Phase Alternating Line system; a European standard for broadcast quality video capture, broadcast and reproduction.

MB/sec. Megabits per second; a unit of transmission bandwidth

FIELD OF THE INVENTION

The invention pertains to a weighting technique for reducing video data to facilitate efficient handling thereof either in transmission over communication media or in facilities storing the data.

BACKGROUND OF THE INVENTION

For many years, video information has been recorded in analog form. More recently, digital cameras have been recording such information in digital forms. In many instances, the information is distributed over digital communication networks to receiving sites containing computer monitors and television sets. Such transmissions—which are used, for example, in TV broadcasts, video conferences, and video transfers over the Internet—usually require sizable amounts of storage and transmission bandwidth; since a typical file transmitted in this manner may contain hundreds or thousands of megabytes, and require real time transport speeds on the order of 15 megabits per second to be synchronously displayable at receiving destinations.

Today, common standards for video transmission are represented by commercial television standards such as NTSC and PAL. Digital forms of these standards, such as D1, require significant transmission bandwidth (e.g. D1 needs on the order of 270 MB/sec.).

Accordingly, there is significant commercial interest in being able to reduce storage and transmission bandwidth requirements associated with such handling of video data. Some of these requirements are eased by use of existing data compression encoding standards such as MPEG and MJPEG, and variants thereof. Such usage generally involves compression of all bits in each video frame based solely on changes from prior frames; and it allows for moderately efficient compression of television quality video. More aggressive compression technologies, such as that disclosed in the above cross-referenced US Patent to Chang et al, allow for even greater reductions in bandwidth usage with loss of picture size and quality.

For example, a video of a celebrity addressing a large crowd of people in a public square might include large amounts of vehicular traffic and other motion. MPEG would use a considerable portion of its allotted bandwidth to capture such traffic and motion in its transmission of the video in compressed form. MJPEG would use more bandwidth than MPEG to transmit a given video series with comparable quality. The process described in the cross-referenced patent to Chang et al uses a version of MPEG with special handling effects to achieve additional compression.

Existing video compression standards, such as MPEG and MJPEG, tend to assign equal importance to all bits or pixels of information in a video frame, and therefore to apply identical compression treatments to all such bits or pixels. Other known techniques for reducing video data allow for apportioning available bandwidth by applying different intensities of compression to foreground and background portions of each transmitted frame; with the effect of producing frame images at receiving sites that show details of moving objects in the foreground with high clarity and details of moving objects in the background with lesser clarity.

We, on the other hand, use a methodology involving selective reductions in rates of transfer of selected picture elements in video frames, based on an importance weighting scheme that we believe is novel. Using this scheme, portions of a frame are assigned different importance weights, and the weighted portions are selectively sampled and transmitted at rates proportional to their assigned weights. In effect, this varies the transmission bandwidth allocated to such portions; so that portions weighted most important are allocated more bandwidth than portions with lesser weights. The portions having lesser weights are relatively compressed in relation to the portions of higher weight, but such compression is ancillary to the main objective of having the transmitted and reproduced motion picture resulting from this technique show details of most important picture elements with greatest clarity and details of less important picture elements with less clarity (and even deliberately blurred or obscured in certain instances).

SUMMARY OF THE INVENTION

Our invention concerns a method and apparatus for reducing video data; e.g. to reduce bandwidth required for picture transmission or to reduce storage capacity needed for image storage. In this arrangement, portions of video (or motion picture) frames, taken from a common source such as a camera or a replayed video tape, are assigned a plurality of different importance ratings—ranging e.g. from most important to less important to least important. The weighted portions are then sampled for transmission (or for transfer to compacted storage) at different frame rates proportionate to their assigned importance weights. Portions assigned highest importance weight are sampled nominally at the same rate as the frame sampling frequency of the original video source, and portions assigned lesser weights are sampled at a rate less than the original frame sampling frequency.

It is important to understand that although picture portions assigned other than a least important weight generally will contain moving or changing image elements, the motion or change per se is not a criteria for the assigned importance classification. Rather, particular facets or characteristics of the elements are key to their weight assignments. Thus, with this methodology, a picture may contain first and second dynamically changing portions wherein the first portion is weighted as most important and the second as less and possibly least important (i.e. the second could be weighted at the same importance level as areas containing completely static elements).

Furthermore, in this technique, tagged portions that represent changing background parts of a picture frame could be assigned importance equal to weights assigned to changing foreground parts of the same frame. The effect of sampling the weighted portions at rates proportional to their assigned weights is to allocate transmission bandwidth to these portions proportionate to their weights; the more important, the more bandwidth. As a consequence of their reduced sampling rates, transmissions of signals representing picture portions having weights less than the highest assignable weight are effectively compressed in relation to transmissions of picture portions assigned the highest weight. However, such compression is considered incidental or ancillary to the previously mentioned main objective of having a transmitted and reproduced motion picture resulting from this technique show details of moving picture elements that are most important with greatest clarity and details of less important picture elements with less clarity (and perhaps even blurred in certain instances).

Signals resulting from application of the present weight assignment and sampling technique may be subjected to standard compression techniques like MPEG prior to transmission. In such usage, the present technique would serve to efficiently rearrange video streams transferred to apparatus performing the standard compression, and output of the latter apparatus would be transmitted to communication and/or storage media.

Thus, portions weighted most important receive a minimal form of compression, in which pixel information representing 100 percent of image detail in respective portions is effectively sampled and transmitted for all frames. Conversely, portions assigned lesser weights receive more intense compression in which pixel information within respective portions is sampled for transmission less frequently (for example, once per transmission of 10 or 20 consecutive frames). Consequently, pixel information in portions having importance weights less than most important and greater than least important would be sampled for transmission at sampling rates less than the rate applied to portions weighted most important but greater than the rate applied to portions weighted least important.

The frequency of transmission of pixel information in least important portions may be less than the frequency required to accurately portray moving objects or elements. In other words, ratings of least importance could be assigned both to static image elements and moving or changing image elements, with the result that appearance of the changing elements could be obscured or blurred.

Our proposed method, and apparatus pertinent thereto, is not dependent upon pixel changes in successive frames per se, but rather upon the desired objective of image reproduction. Thus, if it is desired to have changing image details in a given portion of each captured picture frame reproduced with great clarity, that portion should be delineated and tagged as most important. Conversely, if an objective is to have such changing details obscured or blurred, whether deliberately or because their clarity is immaterial, we delineate the respective portion as least important.

Therefore, we believe that our proposed method and apparatus could be useful to provide additional efficiencies in storage and bandwidth usage over contemporary compression techniques such as JPEG, which have the objective of promoting faithful reproduction of all image details in transmitted frames.

In the example mentioned above pertaining to a public appearance of a celebrity (the president, a movie star, etc.), frame portions showing the celebrity's features (facial and body motion) would be assigned a highest level of importance, frame portions representing reactions of listeners would be assigned intermediate importance, and frame portions representing both static objects (buildings, statues, etc.) and changing objects having no pertinence to the occasion (movement of vehicular traffic, motion of tree limbs and leaves due to wind, in some instances changes associated only with movement of the video camera, etc.) could be rated least important.

Since pixel information of motion picture portions tagged as most important would be sampled and transmitted with a highest repetition frequency, picture portions tagged as less important could be sampled and transmitted at a rate insufficient to reproduce details of movement clearly; i.e. such picture portions could be replayed for transmission at frame rates that would subject them to reproduction in blurred or obscured forms.

Other known compression techniques allow for different treatment of foreground and background portions of a video frame, but such treatment would not necessarily accord different compression treatments to portions of a frame having only subjective interest; e.g. they would equally compress a celebrity's features and gestures as other moving elements of a picture frame such as moving vehicles and swaying tree limbs. Therefore such known techniques would generally require greater transmission bandwidth than techniques we propose here.

Another application example disclosed in this document is that of a security surveillance method and apparatus, wherein frame image portions representing an intruder would be easily distinguished from other picture elements representing objects in motion, and assigned a highest level of importance. Here, for example, frame portions representing moving or changing objects other than an intruder (e.g. a spinning fan or the seconds hand of a clock) would be assigned lesser levels of importance than the level assigned to the representation of a perceived intruder. Thus, after transmission, frame portions representing identifiable features of an intruder would be reproduced with greatest clarity, and details of other moving objects in each frame would be reproduced with potentially less clarity depending upon their associated rates of motion and their assigned rates of transmission handling.

Relative to the above example of a celebrity addressing (or mingling with) a crowd of onlookers, the celebrity's features would be of highest interest, reactions of individual onlookers to the celebrity could be of lesser but still high interest, swaying tree limbs, passing vehicles and static elements (e.g. buildings) would be least interesting. Static elements and moving elements of minimal importance could be marked as least important, and stored and sampled for replay on a very occasional basis. The crowd's reaction would be of more than minimal interest and details of than the buildings and traffic so the crowd details should be sampled, stored and sampled for replay more frequently than the least important elements. Finally, the celebrity's appearance and behavior would be most interesting, and features representing that would be sampled, stored and sampled most frequently.

In prior systems, storage and transmission costs are sometimes reduced by cropping frame images to exclude extraneous background and/or fringe elements. However, this represents a compromise between reproduction of the entire image captured by the camera and the cost of doing so. Our invention allows for storage, transmission and reproduction of the entire image at least cost and with least distortion of interesting image features.

To realize these effects we propose to introduce an editorial tagging, storage and varied rate sampling process, between a standard motion picture source (e.g. camera) and either transmission media or standard compression apparatus (e.g. a standard codec) interfacing to such media. In our process, an editor (or equipment functioning as an editor) marks portions of the captured video stream using a common marking element (e.g. a light pen or outline box) to do the marking. The marks are differentiated to distinguish importance of respective portions.

The marked portions are then sampled at rates directly proportional to the importance assigned to respective marks (e.g. the most important portions being sampled every frame, portions next in importance being sampled every $4^{th}$ frame, portions next in importance being sampled every $8^{th}$ frame, etc.). Accordingly, after transmission and decoding of the sampled context, the resulting images show the most important portions with maximum clarity, and less important portions with less clarity.

These and other effects, objectives and benefits of this technique will be more fully understood and appreciated by considering the following description and claims.

BRIEF DESCRIPTION OF THE DRAWINGS

FIG. 1 schematically depicts currently conventional processing of video data for transmission.

FIG. 2 schematically shows how the technique of this invention fits into and changes the conventional process shown in FIG. 1.

FIG. 3 schematically depicts segmentation of a video page/frame in accordance with the present invention.

FIG. 4 is a schematic of a system for partitioning and sampling data representing motion picture frames in accordance with the present invention.

FIG. 5 is a high level flow diagram for describing operation of the system shown in FIG. 4.

DETAILED DESCRIPTION

Figure 6:
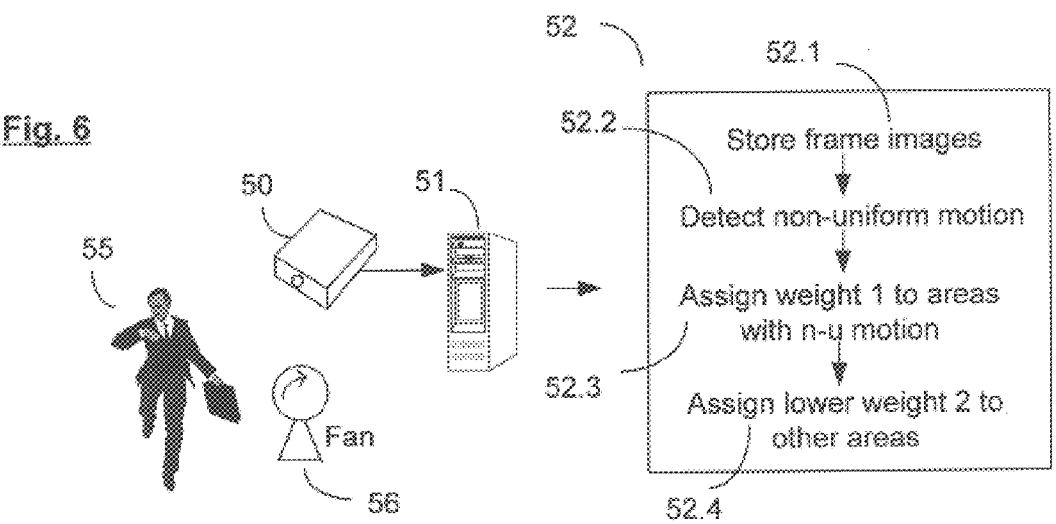
FIG. 6 is a simplified illustration of how the invention could be applied to security surveillance functions.

FIG. 1 represents a prior art system arrangement for processing video data to facilitate efficient transmission thereof. In this arrangement, image data from a video source 1 (e.g. a camera, tape, etc.) is processed at 2 for creating special effects; e.g. for creating special effects such as "Avid's illusion"[1]. The data is then processed at 3 to produce known mixing effects (e.g. for creating elastic reality effects associated with Avid's illusions)[2], and at 4 for editing purposes[3]. Data resulting from processes 2–4 is transmitted in either a digital form indicated at 5 or an analog form indicated at 6. As shown at 7, the digital path may include apparatus exemplified by an MPEG codec for compressing the image data prior to transmission. As shown at 8, optional player apparatus (e.g. a TV set) may be provided to allow viewing of the modified video during or prior to its transmission.

[1] Refer e.g. to web site "http://www/avid.corrlproducts/effects/illusionf"
[2] Refer e.g. to web site "http://www.avid.com/products/video/"
[3] e.g. the editor described at "http/lwww.tek.com/VND/cgi-bin/framed.pl?Document=http://www.tek.com /VND/prods/editstar/&FrameSet=avnd"

FIG. 2 shows how new processes 10 of the present invention are applied between the initial processes 2–4 of FIG. 1 (effects, mixing, editing) and the final transmission stages 5–7 of FIG. 1. FIGS. 3–5 show how the new processes 10 function.

As shown in FIG. 4, incoming video frames in analog form are converted by analog-to-digital converter 20 to corresponding digital data that is applied to digital computer system 21. This assumes that the incoming video is received in analog form, and it is understood that if the incoming video is received in digital form (e.g. as output of a digital camera) the conversion performed at 20 is unnecessary. Computer system 21 places the incoming information into a total picture buffer store 22 and also applies the incoming information synchronously to monitor 23 to display the corresponding video frame images. Light pen 24 and keyboard 25 allow portions of displayed frame images to be marked off and assigned different "importance weights" in a range of weight levels progressing from a level of least importance through levels of intermediate importance to a level of greatest importance. The importance weights are assigned on the basis that the end objective is to have the respective portions subject to reproduction after transmission with different levels of clarity, ranging from maximum clarity for portions with assigned greatest weight to minimal clarity for portions with assigned least weight. Information contained in portions so marked and weighted is routed into associated weighted buffer stores shown generally at 26.

Information in buffers 22 and 26 is then sampled by computer system 21 at selected repetition rates proportioned to weights assigned to buffers 26, and applied to digital-to-analog converter 27 for presentation at such sampled rates to either analog transmission media (6 in FIG. 1) or digital compression codecs and digital transmission media (7 and 5, FIG. 1). In this sampling, image portions having highest importance weights are sampled most frequently (for instance, at a reference rate corresponding to the rate of frame input to buffer 22), image portions having least importance are sampled least frequently (for example, at $\frac{1}{10}$th the reference rate), and image portions having less than highest importance but more than least importance are sampled at intermediate rates (for example, at $\frac{1}{2}$ the reference frequency, $\frac{1}{3}$ the reference frequency, etc.).

FIG. 3 shows a marking scheme that could be applied in this manner. In this example, foreground portions of the image displayed on monitor 23 having different contexts of importance are indicated at 28 and 29 as foreground areas 1 and 2 respectively, and background portions of the image having different importance contexts are indicated at 30 and 31 as background areas 1 and 2 respectively. For purposes of the present discussion, assume that foreground areas 1 have an aspect that is of highest importance, foreground areas 2 have aspects that are of secondary importance less than foreground areas 1, background areas 1 have secondary importance equal to or less than that of foreground areas 1, and background areas 2 have minimal importance less than that of background areas 1. After the discussion of specific application examples to follow, it will be seen that more or less levels of importance can be used with similar effect. It will be seen also that in certain instances the weighting function performed by manual operation of light pen 24 and keyboard 25 could be achieved automatically within computer system 21.

Consistent with the foreground and background weight assignments shown in FIG. 3, the weighted buffers 26 in FIG. 4 may include separate buffers for foreground areas 1 and 2, and separate buffers for background areas 1 and 2. Furthermore, it is understood that in the sampling process outlined above, contents of buffers 26 would be sampled at different rates, ranging from a highest/reference rate for the buffer(s) containing foreground areas 1 to lesser rates for buffers containing foreground areas 2 and background areas 1, to a minimal or lowest rate for buffers containing background areas 2.

Referring to the flow diagram in FIG. 5, operations performed by the apparatus of FIG. 4 include functions shown at 40–45. Functions 40 include receiving, storing and displaying video data to be processed in accordance with this invention, after conventional preprocessing of that data to create special effects, mixing effects, and/or standard editing effects as shown in FIG. 1. As shown at 41, portions of displayed video frame images derived from the received data are marked as areas having highest importance, and as suggested at 42 data representing these portions is stored into a buffer dedicated to those portions. As shown at 43, other areas may be marked as having discrete importance weight(s) lower than most important, and data representing such portions is stored in buffers associated with respective weights. As indicated at 44, playout ratios associated with the buffers containing the importance weighted data are set, and data in those buffers is sampled at frame rates proportionate to associated weights. Decision 45 and the circled connector "a" indicate that this procedure continues until all of the incoming video data has been processed.

FIGS. 6–9 are simplified illustrations of various applications to which this invention can be applied.

FIG. 6 illustrates a security surveillance application wherein video camera 50 surveys an area (or areas) in which unauthorized intrusion is to be detected, and data representing images captured by the camera are fed to a computer system 51 to be processed in accordance with this invention. Functions 52 performed by the system 51 include storing frame images (function 52.1), processing the frame image data to detect "non-uniform" motion susceptible of representing unauthorized intrusion into the area(s) under surveillance (functions 52.2), assigning highest importance ("weight 1") to data representing non-uniform changes in motion (function 52.3) and lesser importance (weight 2") to data not representing such changes (function 52.4). Thus, movement of a person 55 across the surveyed area would be detected as non-uniform changes in motion (at least as the person enters and leaves the area, and as his/her limbs move during the crossing), and data representing the person's image would be assigned weight 1. Conversely, continual motion of an object such as rotating fan 56 would be perceived as uniform motion and data pertaining thereto would be assigned weight 2.

The resulting effect of this processing would be that the pictures developed from the processed camera output would be that data representing images of objects moving across the surveyed area with non-uniform motion would be replayed at higher rates than all other image data and thereby potentially provide clearer images of the moving objects, while conserving bandwidth and storage facilities in the transfer of all other data. An interesting aspect of this application is that the delineation of image parts representing non-uniform object motion could be established automatically, in the system 51, by simply comparing data representing successive frames (whereas the weight assignment functions suggested at 41 in FIG. 5 are indicated to be generally performed manually).

Figure 7:
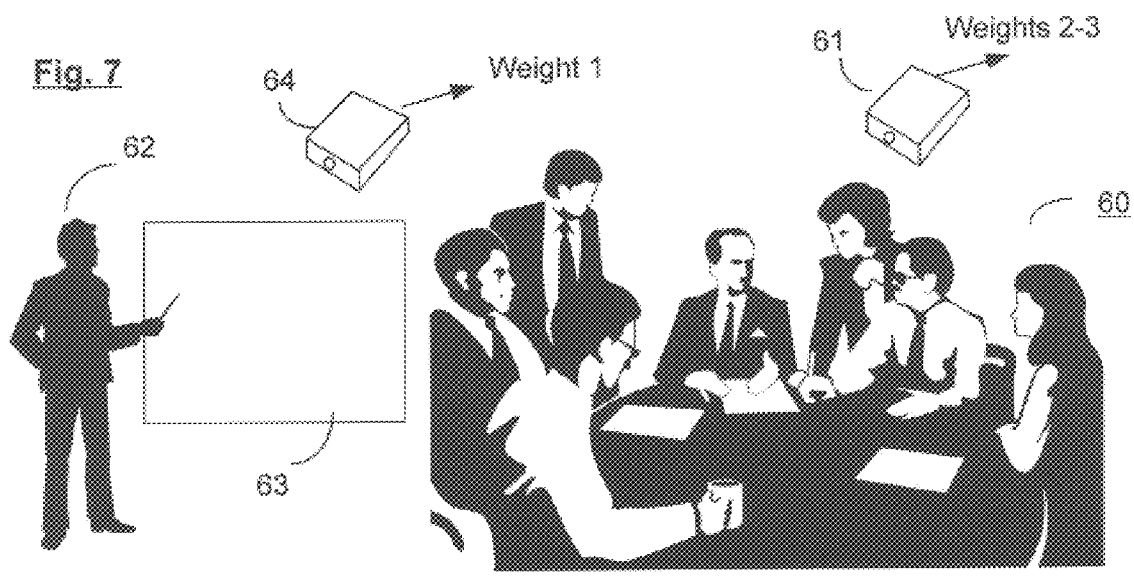
FIG. 7 is a simplified illustration of how the invention could be applied to presentations of video conferences.

FIG. 7 is supposed to illustrate a video-conferencing application wherein seated conferees 60 are viewed by video camera 61 and standing conferee 62, explaining a chart 63 is viewed by video camera 64. In this application, outputs of both cameras would be applied jointly to a not-shown computer for processing in accordance with this invention. Such outputs could be premixed to produce "picture in picture" effects wherein the seated conferees appear as -an inset within a main image showing the chart presenter 62, or wherein the chart presentation appears as an inset within a main image portraying the seated conferees. In accordance with this invention, the chart presentation data from camera 64 would be assigned highest importance weight 1 and the data from camera 61 would be assigned lesser importance weight 2. Thus, in replay, the chart presentation image would be reproduced more frequently than the image of the seated conferees, and therefore details of the chart being presented and the presenter would potentially be viewable more clearly than details of movements of the seated conferees.

Figure 8:
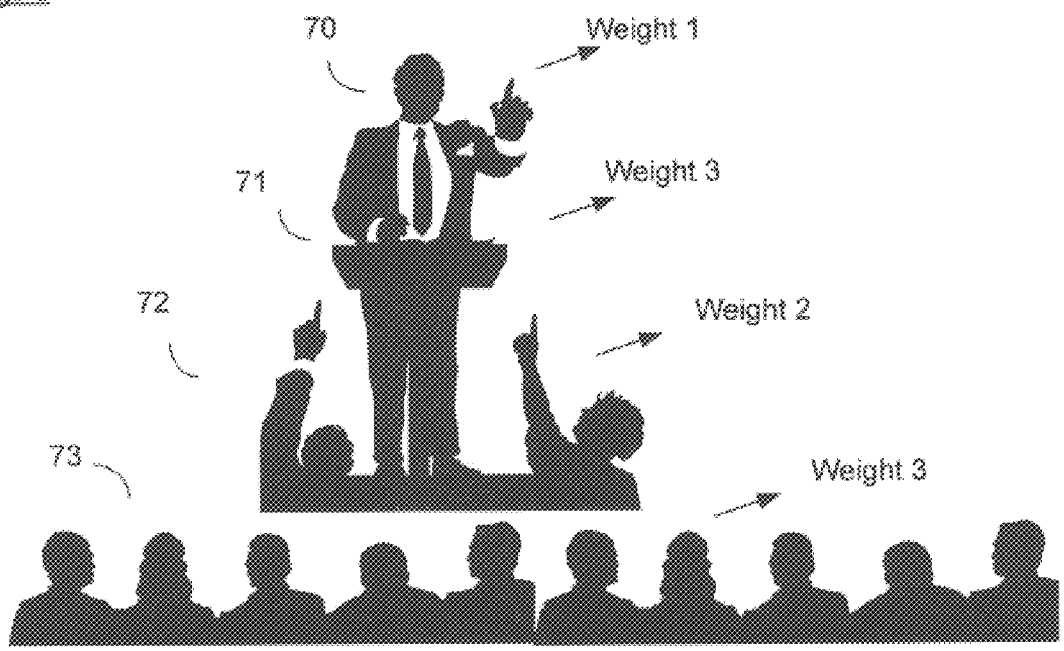
FIG. 8 is a simplified illustration of how the invention could be applied to video representing a public figure addressing an audience.

FIG. 8 is a simplified illustration of a video viewing a speaker 70, at a dais 71, addressing an audience including active media reporters 72 in the foreground and other audience members 73 in the background. As suggested here, the speaker's movements could be assigned weight 1 (most important), the foreground activities of the questioning reporters 72 could be assigned important weight 2 less than weight 1, and views of the background audience members 73 and static objects such as dais 71 could be assigned a least important weight 3. Then, as expected, replayed images of this weighted data would reproduce the speaker most frequently, the reporters less frequently, and the background audience and static objects least frequently. Accordingly, in the replayed images, details of the speaker's facial features and body movements would be seen more clearly than comparable details of the reporters movements, and details of the reporters movements would be reproduced with more clarity than details of movements in the background audience.

Figure 9:
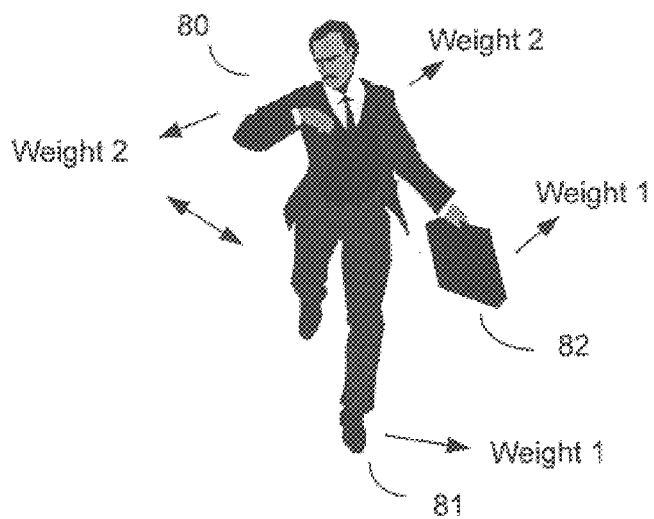
FIG. 9 is a simplified illustration of how the invention could be applied to video materials intended to advertise a specific product.

FIG. 9 is a simplified illustration of processing of a television commercial in accordance with this invention. Actor 80 wears or carries a featured product to be advertised. The product could, for instance, be shoes or sneakers 81 worn by the actor, or a laptop computer 82 carried by him. In this application, the featured product is assigned weight 1 (highest importance) and other parts of the picture image are assigned lesser weight 2. Thus, in replay, the product would be reproduced more frequently (and therefore with potentially greater clarity) than other parts of the viewed image including the actor's face and other body parts not directly relevant to the product. Alternatively, if the actor is a celebrity or famous athlete, it might be desirable to reproduce his face with sufficient clarity to associate it with the featured product; and in that circumstance the face could be assigned either weight 1 or a weight level intermediate those of weights 1 and 2.

Accordingly, we claim the following:

1. Apparatus for reducing video data, to prepare said data for efficient storage and transmission over communication media, said data consisting of a series of picture frames captured at a predetermined frequency, which frames when replayed in succession at said predetermined frequency are useful to display motion pictures, said apparatus comprising:

a frame buffer store for storing data representing said series of frames and images contained therein;

editing apparatus for displaying said frames and images therein, and for enabling portions of said images therein to be marked with importance weighting indications; said weighting indications denoting at least a first level of primary importance and a second level of secondary importance less than said primary importance;

apparatus for storing data representing said marked image portions in association with importance weights represented by respective markings;

processing apparatus, coupled to said frame buffer and said data storing apparatus, for variably sampling said marked image portions to produce a series of modified frames corresponding to the frames stored in said frame buffer; said processing apparatus sampling said image portions marked as having primary importance at a first frequency and said image portions marked as having secondary importance at a second frequency lower than said first frequency, whereby said image portions having primary importance effectively appear in all of said modified frames and said portions having secondary importance effectively appear in some but not all of said modified frames.

2. Apparatus in accordance with claim 1 wherein said image portions having primary and secondary importance both contain data depicting objects in motion.

3. Apparatus in accordance with claim 1 wherein said first sampling frequency is a multiple of said second sampling frequency.

4. Apparatus in accordance with claim 1 wherein said frames stored in said frame buffer depict a public figure addressing an audience, said portions weighted as having primary importance include said public figure, and said portions weighted as having secondary importance include members of said audience.

5. Apparatus in accordance with claim 4 wherein said portions having primary importance include facial features of said public figure, and said portions having secondary importance include features of members of said audience and features of objects moving in the background behind said audience.

6. Apparatus in accordance with claim 5 wherein said audience is in a public thoroughfare and said objects moving behind said audience include vehicular traffic.

7. Apparatus in accordance with claim 1 wherein said frames entered into said frame buffer are produced by a security camera for detecting unauthorized entry into an area under surveillance; wherein said portions weighted as having primary importance include a moving object having a feature of movement capable of representing unauthorized entry into said area under surveillance, and said portions weighted as having secondary importance include another moving object having a feature of movement automatically distinguishable as being incapable of representing said unauthorized entry.

8. Apparatus in accordance with claim 7 wherein said another moving object has a fixed location in said area under surveillance and its movement is confined to that location.

9. Apparatus in accordance with claim 8 wherein said another moving object is a spinning fan.

10. Apparatus in accordance with claim 1 wherein said frames entered into said frame buffer portray a sporting event, said portions having primary importance portray features of selected participants in said event; and said portions having secondary importance portray people at said event other than said selected participants.

11. Apparatus in accordance with claim 1 wherein said frames entered into said frame buffer represent a video commercial advertising a product worn by an athlete in motion; wherein said portions having primary importance include the product being advertised; and wherein said portions having secondary importance include parts of the body of said athlete that are not covered by said product.

* * * * *